United States Patent
Uezono

(10) Patent No.: US 7,593,043 B2
(45) Date of Patent: Sep. 22, 2009

(54) IMAGE PROCESSING DEVICE AND WHITE BALANCE ADJUSTMENT DEVICE

(75) Inventor: Tetsuji Uezono, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 576 days.

(21) Appl. No.: 11/280,014

(22) Filed: Nov. 16, 2005

(65) Prior Publication Data

US 2006/0262197 A1 Nov. 23, 2006

(30) Foreign Application Priority Data

May 18, 2005 (JP) .............................. 2005-144957

(51) Int. Cl.
*H04N 5/228* (2006.01)
(52) U.S. Cl. ................................. 348/222.1; 348/223.1
(58) Field of Classification Search .............. 348/222.1, 348/223.1
See application file for complete search history.

(56) References Cited

U.S. PATENT DOCUMENTS 5,420,630 A * 5/1995 Takei ....................... 348/223.1
5,530,474 A * 6/1996 Takei ....................... 348/224.1
5,831,672 A * 11/1998 Takei ....................... 348/225.1
6,108,037 A * 8/2000 Takei ....................... 348/224.1
6,707,491 B1 * 3/2004 Choi ........................ 348/223.1
6,965,401 B1 * 11/2005 Takei ....................... 348/225.1
2006/0159336 A1 * 7/2006 Uezono ...................... 382/167

FOREIGN PATENT DOCUMENTS

JP 200092509 3/2000

\* cited by examiner

*Primary Examiner*—Jason Chan
*Assistant Examiner*—Usman Khan
(74) *Attorney, Agent, or Firm*—Pamela R. Crocker; Peyton C. Watkins

(57) ABSTRACT

The present invention provides a white balance adjustment device that is capable of adjusting white balance by estimating a color of a light source with a high degree of accuracy, even for a scene in which an object such as a leaf is present. The white balance adjustment device divides a captured image into a plurality of blocks, and extracts a representative color difference (Tg, Ti) from each block, and a characteristic pixel (Tg0, Ti0) having a maximum color difference in each block. The white balance adjustment device calculates a light source color estimation vector from a representative value pixel and a characteristic pixel for each block, and estimates a convergence point of light source color estimation vectors of the plurality of blocks as the color of the light source used for the input image to adjust the white balance.

3 Claims, 8 Drawing Sheets

US 7,593,043 B2

IMAGE PROCESSING DEVICE AND WHITE BALANCE ADJUSTMENT DEVICE

FIELD OF THE INVENTION

The present invention relates to a technique for adjusting the white balance of an image captured by an image capture device, such as a digital camera.

BACKGROUND OF THE INVENTION

In a digital camera or the like, automatic white balance adjustment is performed so that the color of a subject that is white under a given source of light is reproduced as white. Available white balance adjustment methods include a method in which the balance of RGB components of a signal for each pixel is adjusted so that an average for an entire image represents an achromatic color. Also, there is another known technique in which an image is divided into a plurality of blocks, an average value of RGB components is calculated for each block, only one or more blocks whose average values are within a predetermined range are selected, and the RGB components are adjusted so that an average value of RGB components for a group of the selected blocks represents an achromatic color. Japanese Patent Laid-Open Publication No. 2000-92509 discloses a technique wherein an image is divided into a plurality of blocks, a representative value is calculated for each block, and representative values for all blocks are used to calculate white balance gain.

FIG. 10 is a block diagram showing a structure of a related art white balance adjustment device. An image capture device 10, such as a digital camera, outputs a captured digital image to a block dividing circuit 12. The block dividing circuit 12 equally divides an input image into a plurality of blocks. Each block contains "n by m" pixels. The block dividing circuit 12 sequentially outputs the blocks to a representative value calculating circuit 14. The representative value calculating circuit 14 calculates an average value of RGB components for n*m pixels constituting each block, and further calculates a representative value (Tl, Tg, Ti) based on the block average value using the following linear transformation:

$$\begin{pmatrix} Tl \\ Tg \\ Ti \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \quad (1)$$

where Tl represents the luminance of a block, and Tg and Ti represent the color difference of a block. The representative value calculating circuit 14 outputs the representative value (Tl, Tg, Ti) calculated for each block to a white balance evaluating circuit 16.

The white balance evaluating circuit 16 evaluates the reliabilities of the respective blocks, calculates weighting factors in accordance with the evaluated reliabilities, and outputs the weighting factors to a white balance gain calculating circuit 18. The white balance gain calculating circuit 18 calculates a white balance gain value by performing a weighted average using the representative values of the blocks, and the weighting factors calculated by the white balance evaluating circuit 16 based on the reliabilities of the blocks. More specifically, white balance gains are calculated by the following equations:

$$\begin{pmatrix} RMix \\ GMix \\ BMix \end{pmatrix} = \begin{pmatrix} 1 & -1 & -1 \\ 1 & 1 & 0 \\ 1 & -1 & 1 \end{pmatrix} \begin{pmatrix} TlMix \\ TgMix \\ TiMix \end{pmatrix} \quad (2)$$

$$\text{MaxMix} = \max(R\text{Mix}, G\text{Mix}, B\text{Mix}) \quad (3)$$

$R$gain=MaxMix/$R$mix $G$gain=MaxMix/$G$Mix $B$gain=MaxMix/$B$Mix  (4)

where TlMix, TgMix, and TiMix represent weighted average values obtained from the representative values of the blocks. The value (RMix, GMix, BMix) calculated by the above equations represents the color of a light source illuminating the subject. The white balance gains Rgain, Ggain, and Bgain are adjusted so that the color obtained when light coming from an estimated light source is reflected from a white object is corrected to be gray (or, in other words, so that R=G=B is satisfied). The calculated gains are output from the white balance gain calculating circuit 18 to a white balance adjusting circuit 20. The white balance adjusting circuit 20 multiplies RGB values for each pixel included in an input image from the image capture device 10 by the respective gains calculated by the white balance gain calculating circuit 18, thereby adjusting the white balance of the image to output the result thereof.

However, the above-described related art technique has a problem in that, because a representative value for each block is obtained using the equation (1) based on an average value of RGB components calculated for all n*m pixels included in each block, when a certain color of an object existing within a block is different from the color of a light source, the average value of the block will be influenced by the color of this object.

As an example, FIG. 11 shows a block 100, which is one of a plurality of blocks divided from an image. The block 100 includes n*m pixels, and an average value of RGB components for all the pixels is calculated as the average value for this block. However, as shown in this figure, the block 100 includes an image 102 of a green leaf. In such a case, because the background color and the green color are averaged, the resultant average value does not accurately indicate the color of a light source illuminating the block. As a result, although the light source should be determined as daylight, the light source can be erroneously determined as a fluorescent lamp. As described, related art techniques do not always provide sufficient measures to estimate the color of an actual light source in cases where an object of a chromatic color is present within a block, or where a state within a block is not uniform (for such cases, although the reliability of each block can be used to reduce the unwanted influence, it is then necessary to accurately evaluate the reliability), which has been a factor causing reduced accuracy of white balance adjustment.

An objective of the present invention is to provide a device that is capable of performing white balance adjustment easily and reliably even in cases where an object of a chromatic color is present within a block, or where a state within a block is not uniform.

SUMMARY OF THE INVENTION

According to one aspect of the present invention, there is provided an image processing device comprising calculating means for calculating a light source color estimation vector from an average value color difference pixel and a maximum value color difference pixel in a color difference space, wherein the average value color difference pixel and the maximum value color difference pixel are detected from among pixels included within a predetermined region in an input image, and controlling means for controlling white balance correction by estimating a color of a light source used for the input image based on a direction of the light source color estimation vector.

Further, according to another aspect of the present invention, there is provided a white balance adjustment device for adjusting white balance in an image capture device. The white balance adjustment device comprises means for dividing an input image into a plurality of blocks; means for detecting, in a color difference space, an average color difference coordinate point and a large color difference coordinate point for each block; means for calculating a vector from the average color difference coordinate point and the large color difference coordinate point for each block; means for calculating coordinates of a convergence point of vectors calculated for either some or all blocks of the plurality of blocks constituting the input image; and means for adjusting white balance by estimating a color of a light source used for the input image based on the coordinates of the convergence point.

According to the present invention, a vector is calculated from an average value color difference pixel and a maximum value color difference pixel (or a large color difference pixel having a larger color difference than a predetermined threshold). The average color difference pixel reflects a color mixture of an object color and a light source color, and the large color difference pixel reflects the object color. Therefore, it is possible to estimate the light source color to be present in a direction of the vector (or on an extended line of the vector) calculated using these pixels to adjust white balance using the estimated light source color.

According to the present invention, it is possible to adjust white balance by estimating the color of a light source easily and accurately using a vector calculated based on color differences, without using a complicated analysis algorithm or a large number of analysis parameters.

BRIEF DESCRIPTION OF THE DRAWINGS

A preferred embodiment of the present invention will be described in further detail based on the following drawings, wherein.

DETAILED DESCRIPTION OF THE INVENTION

A preferred embodiment of the present invention will be described below with reference to the drawings.

Figure 1:
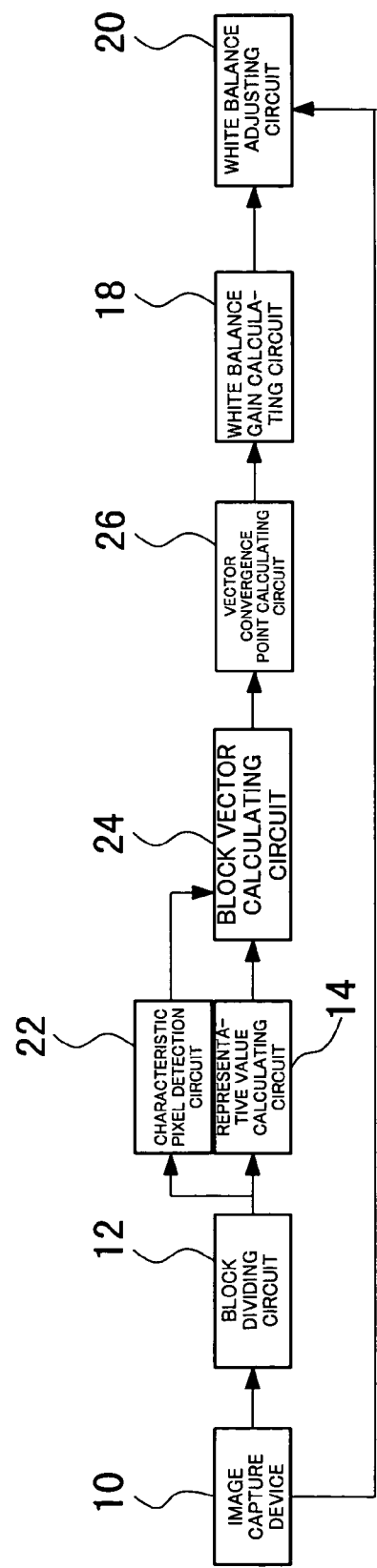
FIG. 1 is a block diagram showing a structure of a preferred embodiment of the present invention.
Figure 10:
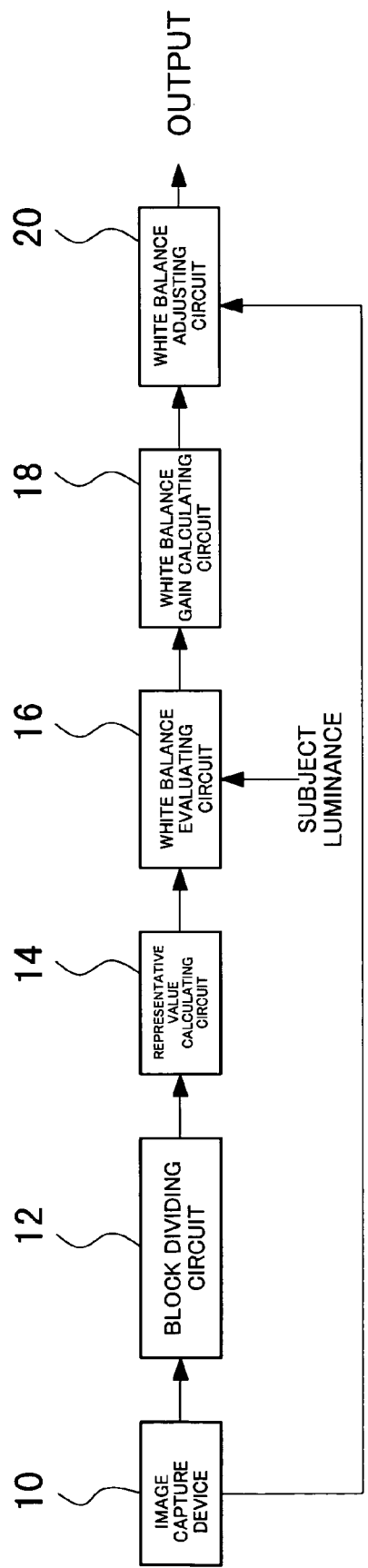
FIG. 10 is a block diagram showing a structure of a related art device.
Figure 11:
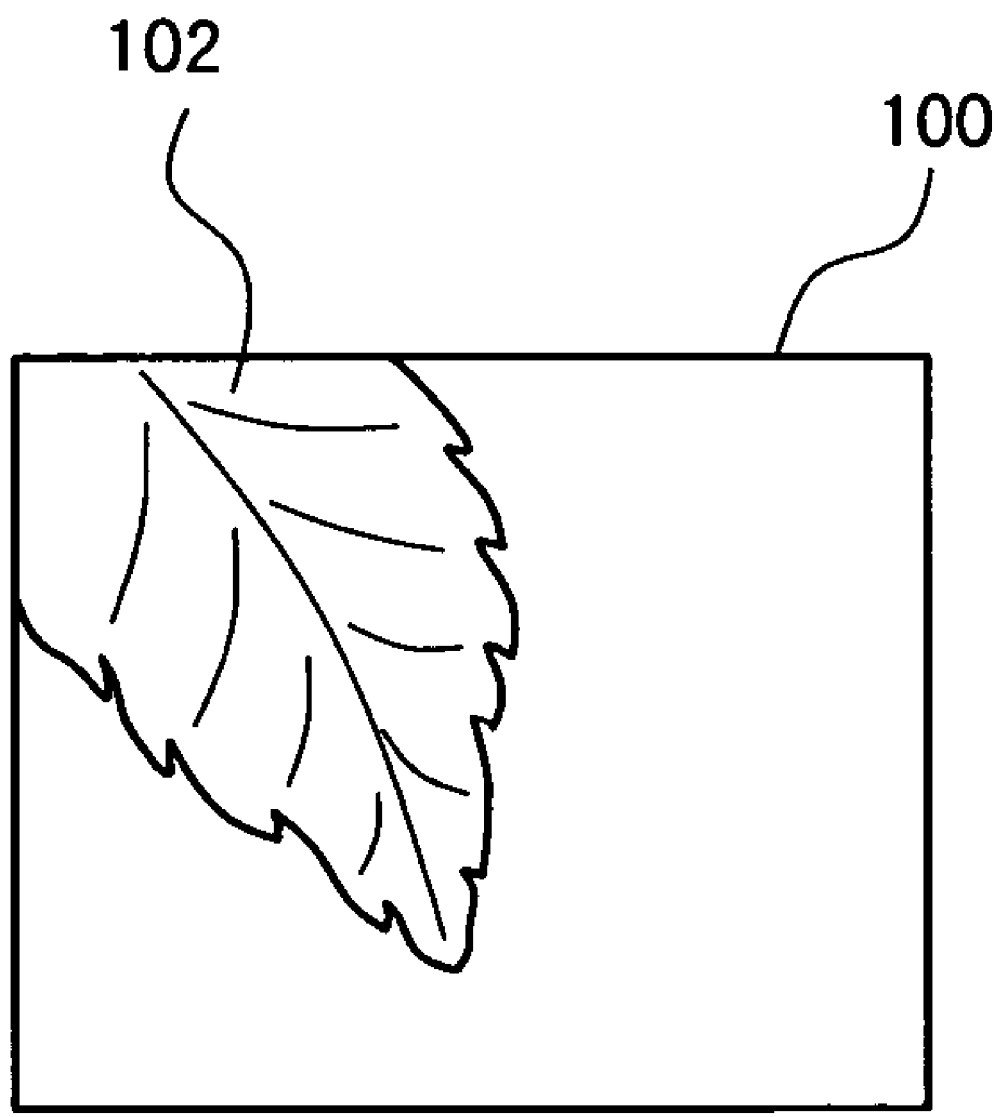
FIG. 11 is an illustrative diagram showing a block including an image of a leaf.

FIG. 1 is a block diagram showing a structure of a white balance adjustment device according to an embodiment of the present invention. The white balance adjustment device according to the present embodiment may be incorporated in a digital camera in the form of an image processing IC having a processor and a memory. In contrast to the structure of the related art shown in FIG. 10, a characteristic pixel detection circuit 22 is provided in parallel with a representative value calculating circuit 14. Both an output from the representative value calculating circuit 14 and an output from the characteristic pixel detection circuit 22 are supplied to a block vector calculating circuit 24. Further, an output from the block vector calculating circuit 24 is supplied to a vector convergence point calculating circuit 26. An output from the vector convergence point calculating circuit 26 is supplied to a white balance gain calculating circuit 18.

A block dividing circuit 12 divides an image input from an image capture device 10 equally into a plurality of blocks, and sequentially outputs the blocks to the representative value calculating circuit 14 and the characteristic pixel detection circuit 22.

The representative value calculating circuit 14 calculates an average value of RGB components for n*m pixels constituting each block, as in the related art, and further calculates a block luminance (Tl) and a block color difference (Tg, Ti) according to the equation (1) applied to the average value. The representative value calculating circuit 14 outputs a representative value (Tl, Tg, Ti) calculated for each block to the block vector calculating circuit 24.

On the other hand, the characteristic pixel detection circuit 22 calculates a luminance (Tl) and a color difference (Tg, Ti) for each pixel of the n*m pixels constituting each block according to the equation (1). It should be noted here that the representative value calculating circuit 14 calculates a luminance and a color difference using the equation (1) based on an average value of RGB components calculated for all pixels constituting each block, whereas the characteristic pixel detection circuit 22 calculates a luminance and a color difference using RGB values themselves for each pixel. After a luminance and a color difference are obtained for each of the n*m pixels constituting each block, the characteristic pixel detection circuit 22 further calculates a distance (color difference distance) in a luminance and color difference space for each pixel using the following equation:

$$\text{Distance} = (Ti^2 + Tg^2)^{1/2}$$

After a distance in the luminance and color difference space is obtained for each pixel, the characteristic pixel detection circuit 22 compares magnitudes of distances calculated for all pixels included in one block, and extracts and outputs a pixel having a maximum distance in the block (maximum color difference pixel) to the block vector calculating circuit 24 as a characteristic pixel of the block.

Figure 2:
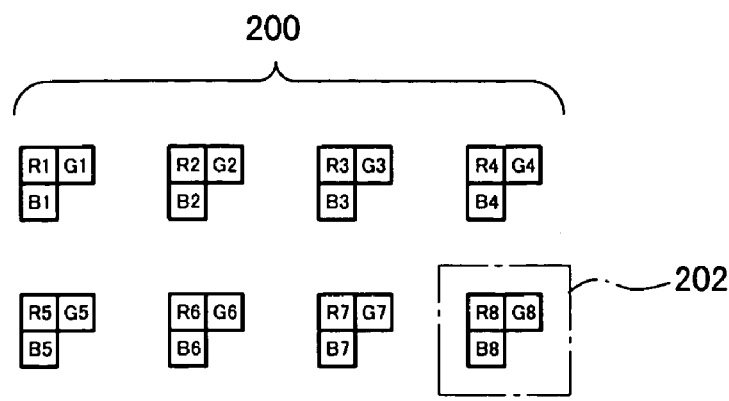
FIG. 2 is a diagram showing an arrangement of pixels included in an input image.

FIG. 2 shows an example of a pixel group constituting each block. Each pixel group 200 constituting a block includes an R pixel component, a G pixel component, and a B pixel component. In the present embodiment, an R pixel component, a G pixel component, and a B pixel component are grouped to form one pixel 202. The characteristic pixel detection circuit 22 calculates a luminance (Tl) and a color difference (Tg, Ti) using pixel component values representing an R pixel component, a G pixel component, and a B pixel component included in each pixel, and further calculates a distance in the luminance and color difference space using the calculated color difference (Tg, Ti). After distances are obtained for all pixels constituting a block, the characteristic pixel detection circuit 22 extracts a pixel having a maximum distance (maximum color difference) as a characteristic pixel of the block.

Figure 3:
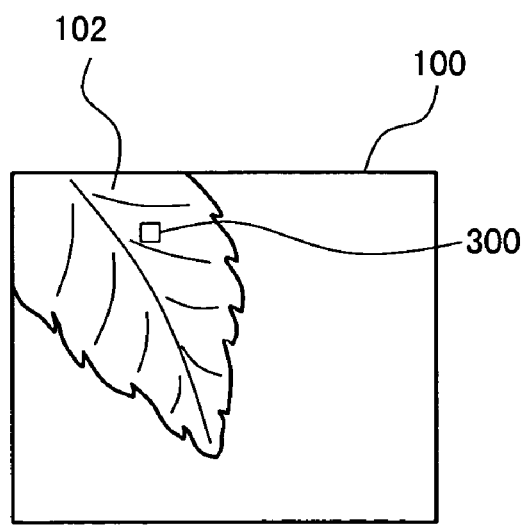
FIG. 3 is a schematic diagram for illustrating a characteristic pixel in a block.

FIG. 3 shows a characteristic pixel extracted from a block 100, that is, a maximum color difference pixel 300. Because an image 102 of a leaf is present in the block 100, a color difference in that area has a maximum value. Therefore, the maximum color difference pixel 300 shown in this diagram is a part of the leaf image 102.

The block vector calculating circuit 24 receives a color difference of a characteristic pixel input from the characteristic pixel detection circuit 22, and a color difference of a representative value input from the representative value calculating circuit 14, and generates a light source color estimation vector from these two types of color difference data. More specifically, coordinate points corresponding to these two color differences are connected to each other in a color difference space to form a vector, which is used as a light source color estimation vector.

Figure 4:
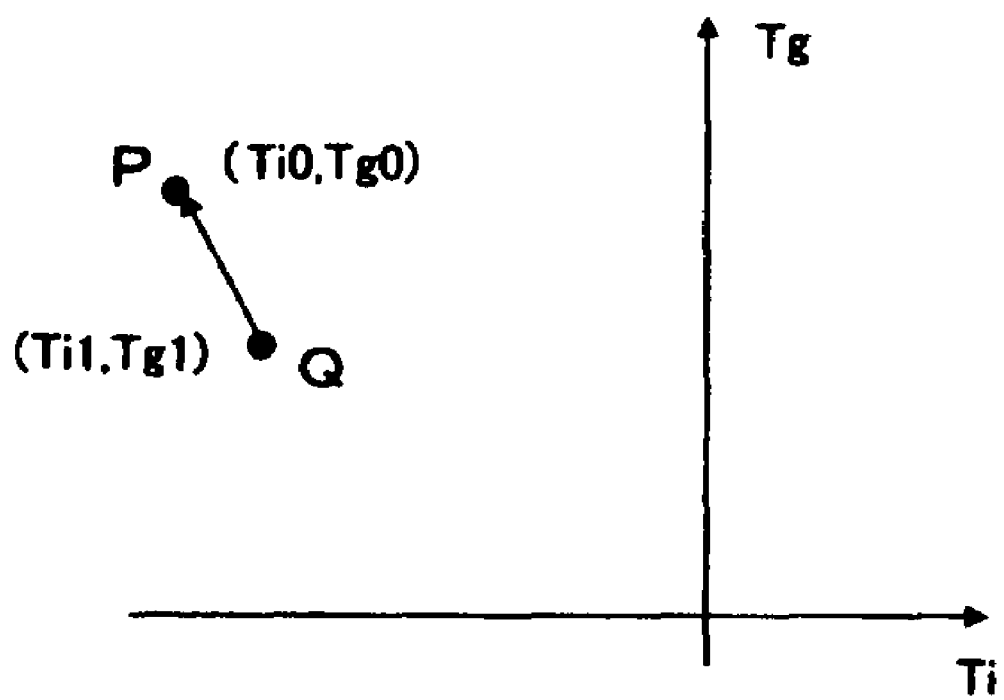
FIG. 4 is a diagram for illustrating a light source color estimation vector that is formed by connecting a characteristic pixel and a representative value pixel in a color difference space.

FIG. 4 shows a characteristic pixel and a representative pixel for a certain block. A pixel P represents a characteristic pixel (Ti0, Tg0) having a maximum color difference in that block, and a pixel Q represents a representative value pixel (Ti1, Tg1) of the block determined by the representative value calculating circuit 14. It can be considered that, as already described above, the color difference of the representative pixel Q of the block represents a color mixture obtained by mixing the color of an object existing within the block and the color of a light source, and that the color difference of the characteristic pixel represents the color of the object present in the block. Therefore, when attention is focused on a vector formed by the characteristic pixel P and the representative pixel Q of the block, because the vector can be considered to define the interrelationship between the object color and the color mixture of the object color and the light source color for the block, it is estimated that there is a high possibility that the light source color is present on a straight line including this vector, and, in other words, in a direction of the vector. Although the vector shown in this diagram is formed by the representative pixel Q used as a starting point and the characteristic pixel P used as an endpoint, it is also possible to employ a vector that uses the characteristic pixel P as a starting point, and uses the representative pixel Q as an endpoint. In such cases, it can be estimated that there is a high possibility that the light source color is present on an extended line in a direction of the vector in which the characteristic pixel P is used as a starting point, and the representative pixel Q is used as an endpoint. In the present embodiment, light source color estimation vectors for all blocks supplied from the block dividing circuit 12 are each calculated based on the above-described principles from a representative value calculated by the representative value calculating circuit 14 and a characteristic pixel calculated by the characteristic pixel detection circuit 22 so that the color of a light source is estimated in a color difference space based on the light source color estimation vectors thus calculated for the respective blocks. The block vector calculating circuit 24 outputs a light source color estimation vector calculated for each block to the vector convergence point calculating circuit 26.

The vector convergence point calculating circuit 26 calculates a convergence point of light source color estimation vectors calculated for all blocks. Because, as described above, there is a high possibility that the light source color is present on an extension of a light source color estimation vector, the convergence point of light source color estimation vectors calculated for all blocks is considered to represent the light source color for all the blocks, that is, the light source color for an input image scene.

Figure 5:
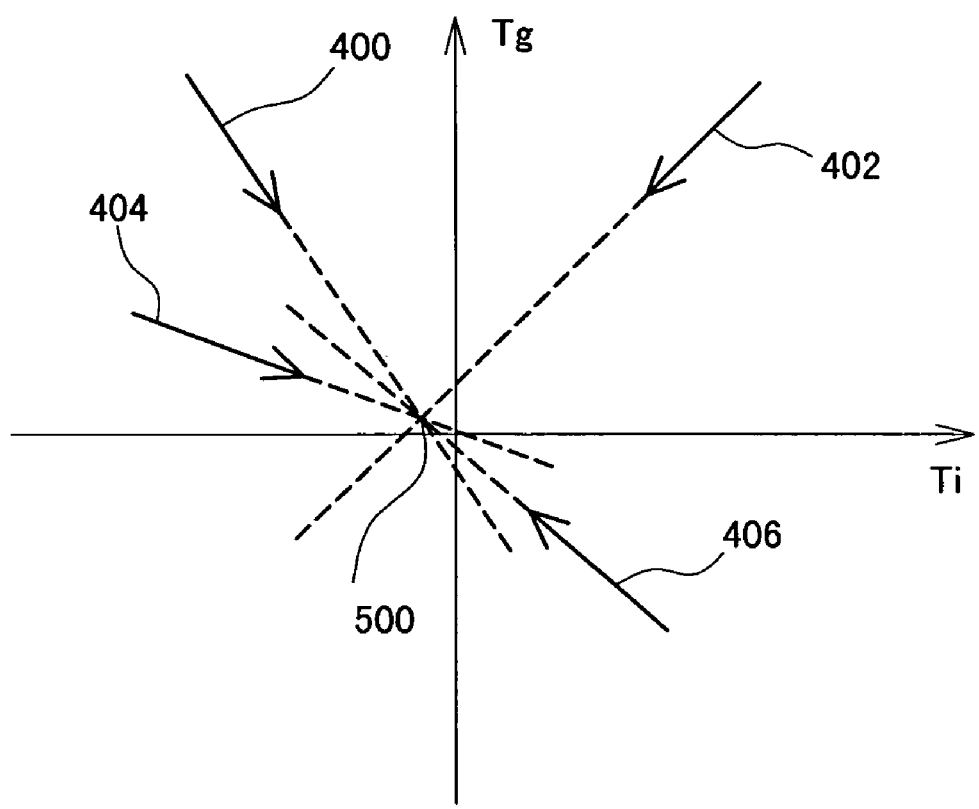
FIG. 5 is an illustrative diagram showing a state of convergence of light source color estimation vectors (under ideal conditions)

FIG. 5 shows a manner in which the vector convergence point calculating circuit 26 calculates a point of convergence of vectors. Specifically, vectors 400, 402, 404, and 406 calculated for a plurality of blocks, and a convergence point 500 of these vectors are shown. When it is assumed that a convergence point 500 of light source color estimation vectors calculated for all blocks is located at a color difference coordinate point (Tiα, Tgα), and that a light source color estimation vector for a certain block is given by the equation: $a_n Ti + b_n Tg + c_n = 0$, the square "d" of a distance between the convergence point 500 and the light source color estimation vector is given by the following equation:

$$d = \{a_n Ti\alpha + b_n Tg\alpha + c_n\}^2 / (a_n^2 + b_n^2)$$

Figure 6:
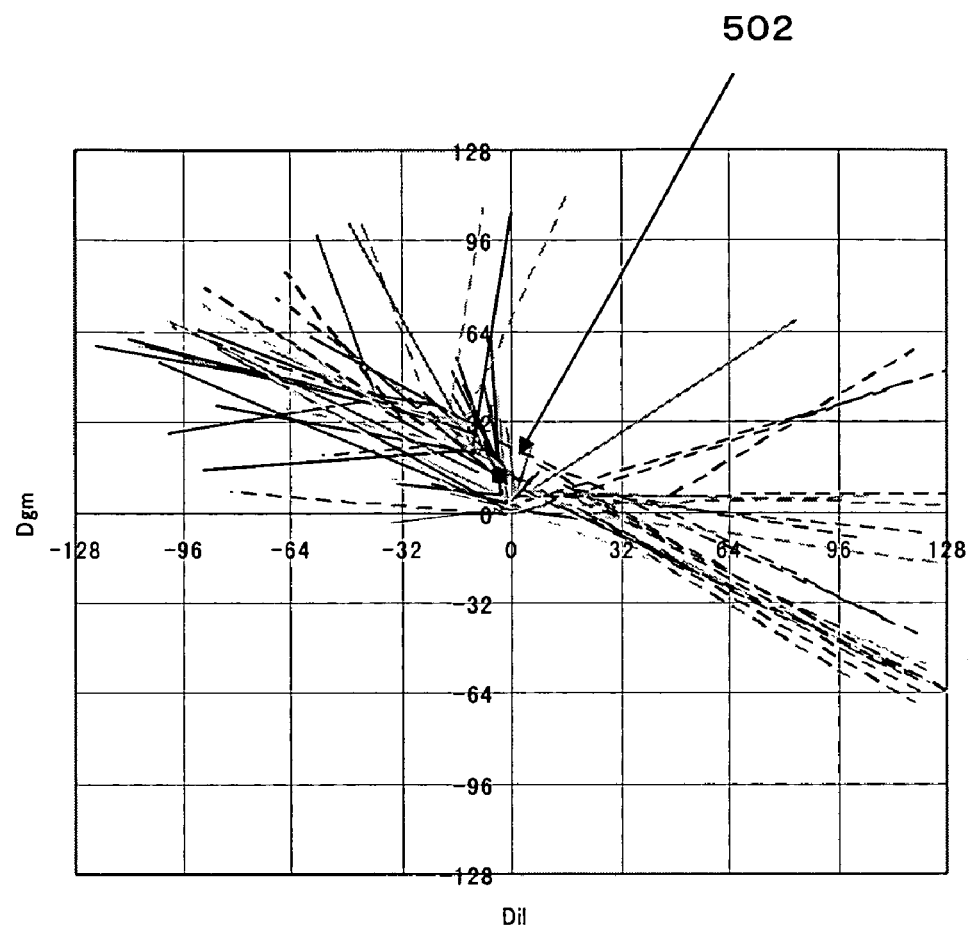
FIG. 6 is an illustrative diagram showing a state of convergence of light source color estimation vectors.

Theoretically, the convergence point 500 is determined to be a point at which d=0 is satisfied for all the light source color estimation vectors 400, 402, 404, and 406. However, because it is rare in practice that all light source color estimation vectors for all blocks converge at one point (in FIG. 5, a convergence under ideal conditions is shown), a point at which an average of distances (or an average of squares "d" of distances) between the light source color estimation vectors 400-406 for all blocks and the convergence point 500 is minimized may be used as the convergence point 500. Such a convergence point 500 can be calculated by, for example, a quasi-Newton method. FIG. 6 shows an example of light source color estimation vectors calculated for all blocks of a captured image. As shown, the vectors for all blocks do not, in fact, converge at one convergence point, but have variations. In this diagram, a convergence point 502 calculated by a quasi-Newton method is shown. The vector convergence point calculating circuit 26 estimates the color difference coordinates of the convergence point 500 calculated in the above-described manner as a color difference of the light source, and estimates an average value of luminances for all blocks calculated by the representative value calculating circuit 14 as a luminance of the light source to output the color difference and luminance thus estimated to the white balance gain calculating circuit 18. The white balance gain calculating circuit 18 calculates white balance gains according to the equations (2), (3), and (4) to output the white balance gains thus calculated to the white balance adjusting circuit 20. The white balance gain calculating circuit 18 may also be used to identify the type of color of a light source (such as daylight or a fluorescent lamp) based on the coordinates of the light source color obtained by the vector convergence point calculating circuit 26 to output the identified type to the white balance adjusting circuit 20. The white balance adjusting circuit 20 can adjust the white balance in accordance with predetermined gains for each type of light source (such as gains for daylight, or gains for a fluorescent lamp).

Figure 7:
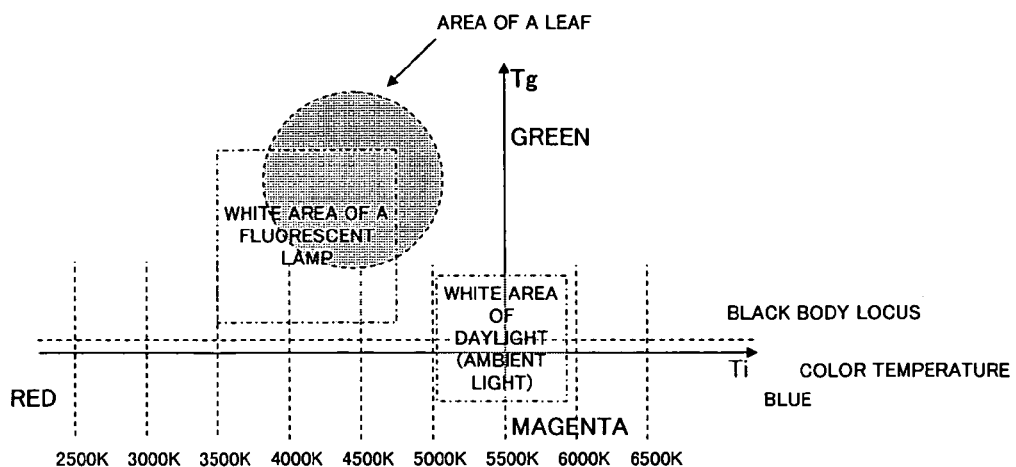
FIG. 7 is an illustrative diagram showing a relationship between a white area of daylight, a white area of a fluorescent lamp, and an area of a leaf in a color difference space.

FIG. 7 shows a white area of daylight, a white area of a fluorescent lamp, and an area of a leaf in a color difference space. An essential factor in adjusting white balance is to correctly distinguish these light source colors from each other based on a captured image. However, as shown in this diagram, the ranges of the white area of a fluorescent lamp and the area of a leaf partially overlap in the color difference space. Therefore, when an image of a leaf is present in a scene, the related art device has a problem in that even if the actual light source is daylight, the light source for this scene can possibly be misidentified as a fluorescent lamp.

Figure 8:
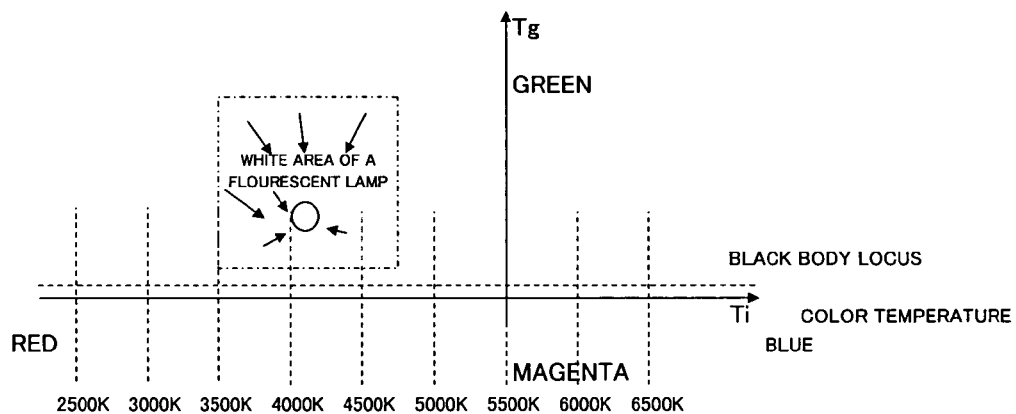
FIG. 8 is an illustrative diagram showing a state of convergence of light source color estimation vectors to a point in the white area of a fluorescent lamp in a color difference space.
Figure 9:
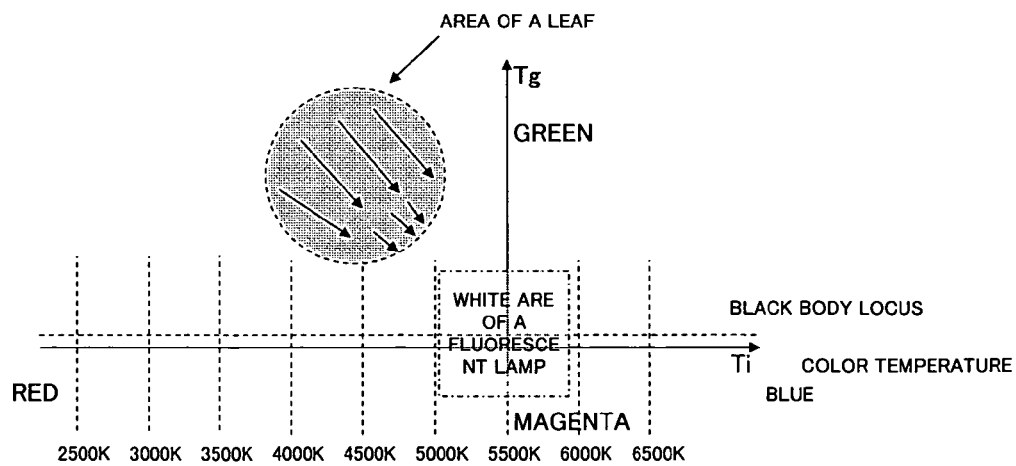
FIG. 9 is an illustrative diagram showing a state of convergence of light source color estimation vectors to a point in the white area of daylight in a color difference space.

FIG. 8 shows a state of light source color estimation vectors under a fluorescent lamp, and FIG. 9 shows a state of light source color estimation vectors under daylight. Under a fluorescent lamp, light source color estimation vectors converge on the white area of a fluorescent lamp. This also holds true for cases where a leaf is present. On the other hand, under daylight, even if light source color estimation vectors are in the area of a leaf, the vectors do not converge near the white area of a fluorescent lamp, but the vectors converge in a direction toward the white area of daylight. Thus, even in cases where an image of a leaf is present, by searching for a convergence point of light source color estimation vectors, it is possible to correctly determine that the light source is not a fluorescent lamp but is daylight.

As described above, according to the present embodiment, simply by calculating a representative value for each block, and extracting a characteristic pixel for each block, thereby calculating a light source color estimation vector from these two pixel points, it is possible to accurately estimate the color of a light source to properly adjust white balance. In the present embodiment, the color of a light source can be estimated with a higher degree of accuracy by simply extracting a characteristic pixel from an image without having to additionally introduce a complicated scene analysis algorithm and/or a large number of control parameters.

Although the preferred embodiment of the present invention has been described above, the present invention is not limited to the above-described embodiment, but various changes and modifications are possible within the scope of the invention.

For example, although, in the above-described embodiment, light source color estimation vectors are calculated for all blocks constituting an input image so that a convergence point is calculated from all the light source color estimation vectors, it is also possible to calculate a convergence point using light source color estimation vectors calculated for blocks that are selected from among all blocks constituting an input image.

Further, although, in the above-described embodiment, a pixel having a maximum color difference within a block is extracted as a characteristic pixel for this block, it is also possible to set a threshold and select a characteristic pixel from a group of pixels each having a color difference equal to or greater than this threshold. Because such a pixel having a color difference equal to or greater than a threshold also reflects the color of an object to some extent, the color of a light source can be estimated with a certain degree of accuracy. As the threshold is increased, the accuracy improves.

Further, when the magnitude of a light source color estimation vector is less than a predetermined value, because it can be considered that there is no significant difference between the representative pixel and the characteristic pixel, it is also possible to ignore this light source color estimation vector.

What is claimed is:

1. A white balance adjustment device for adjusting white balance in an image capture device, the adjustment device comprising:
    means for dividing an input image into a plurality of blocks;
    means for detecting, in a color difference space, an average color difference coordinate point and a large color difference coordinate point having a larger color difference than a predetermined threshold for each block;
    means for calculating a plurality of vectors, one vector for each block, between the average color difference coordinate point and the large color difference coordinate point for each block;
    means for calculating coordinates of a convergence point of vectors calculated for either some or all blocks of the plurality of blocks constituting the input image; and
    means for adjusting white balance by estimating a color of a light source used for the input image based on the coordinates of the convergence point.

2. The white balance adjustment device for adjusting white balance in an image device as in claim 1, wherein the large color difference coordinate point is a point which has a maximum color difference.

3. The white balance adjustment device for adjusting white balance in an image device as in claim 1, wherein the vector connects two coordinates.

* * * * *